Figure 1:
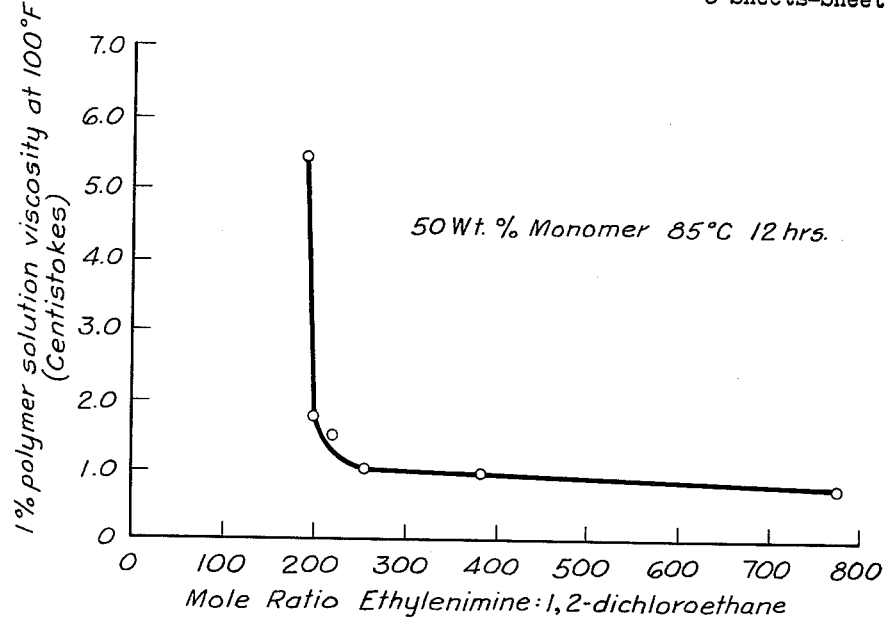

INVENTOR.
Billy W. Wilson
BY
Griswold & Burdick
ATTORNEYS

United States Patent Office 3,203,910
Patented Aug. 31, 1965

3,203,910
POLYMERIZATION OF ALKYLENIMINES
Billy W. Wilson, Lake Jackson, Tex., assignor to The Dow Chemical Company, Midland, Mich., a corporation of Delaware
Filed Apr. 13, 1962, Ser. No. 187,345
16 Claims. (Cl. 260—2)

This invention concerns an improved process for polymerization of alkylenimines. More specifically, the invention concerns the use of polyhalogenated polymerization initiators to prepare aqueous solutions of polyalkylenimines having predetermined desired viscosities.

Polyalkylenimines are used for a wide variety of purposes. In many applications these polymers are employed in aqueous solutions where the utility is determined by the solution viscosity. It is therefore advantageous, and often essential, to accurately control the preparation of the polyalkylenimine in order to obtain a polymer having a degree of water solubility enabling the preparation of aqueous solutions viscosity, for example, is essential when maximum flocculation activity of polyalkylenimine solutions is desired. In the following description the viscosity values referred to are those of aqueous polyalkylenimine solutions, containing one percent by weight of polymer, measured by use of a modified Ostwald viscometer at a temperature of 100° F.

It has now been discovered, in accordance with the present invention, that polyhalo aliphatic and polyhalo substituted aliphatic polymerization initiators may be advantageously employed, under controlled conditions of concentration, temperature and mixing, to prepare polyalkylenimines. The term "polyhalo" is used to describe initiators containing at least two active halogen atoms per molecule, i.e. chloro, bromo and chlorobromo compounds. The commonly used polymerization initiators, such as organic and inorganic acids, may generally be employed at varying concentrations without showing a correlative effect upon the polyalkylenimine solution viscosity. In contrast, the polyhalo initiators employed in the process of the present invention enable the preparation of polyalkylenimine solutions of predetermined, desired viscosities due to a direct relationship between initiator concentration and aqueous polymer solution viscosity over a wide range of monomer-initiator ratios.

Polymerization of alkylenimines is accomplished, in accordance with this invention by one of several procedures which differ only in the sequence of the basic step necessarily involved. As a matter of convenience these procedures, described below, will be referred to as the "full-charge method," the "split-charge method" and the "constant-feed method."

FULL-CHARGE METHOD

A reaction flask is charged with alkylenimine monomer, ployhalo initiator and water. The resulting solution is then heated for two hours at a temperature of from 50° to 70° C. After two hours the temperature is raised to from 70° to 100° C. and the reaction is continued until the solution viscosity reaches a desired value. The contents are continuously stirred throughout the reaction period.

SPLIT-CHARGE METHOD

In this variation the monomer, water and a minor portion of the initiator are placed in the reaction flask. The continuously stirred contents are heated for two hours at 50° to 70° C. followed by two hours at 70° to 100° C. After cooling to room temperature the remaining portion of initiator is added, the temperature is raised to 70° to 100° C. and the stirred contents are heated until the solution viscosity reaches a desired value.

CONSTANT-FEED METHOD

In still another variation the initiator and water are added to the reaction flask, which is then heated to 70° to 100° C. Alkylenimine is continuously added to the stirred contents at a rate sufficient to maintain the exothermic reaction temperature at about 70° to 100° C. Upon completion of the monomer addition the temperature is maintained at the same level until a desired sloution viscosity is attained.

The four major factors which determine the final polymer product viscosity are (1) the specific polyhalo polymerization initiator used, (2) the mole ratio of monomer to initiator, (3) the relative amounts of monomer and water employed, and (4) the temperature.

The effect of the polyhalo polymerization initiator employed is determined by simple test procedures. A comparison of the viscosities of polyethylenimine solutions prepared by using 1,3-dichloropropane as the initiator and by using 1,2-dichloroethane as the initiator illustrates this effect. The viscosity of a 1 per cent polymer by weight aqueous solution of polyethylenimine prepared by the full-charge method described above was 3.82 centistokes, when 1,3-dichloropropane was the initiator while substitution of 1,2-dichloroethane as the initiator in the same experiment resulted in a solution viscosity of 1.21 centistokes.

Increasing the amount of initiator employed, i.e. decreasing the magnitude of the mole ratio of monomer to initiator, results in increased polymer solution viscosity. This increase is uniform over a wide range until a ratio is reached where cross-linking of the polymer chains occurs rapidly with a short, sharp increase in solution viscosity followed by formation of a water-insoluble polymeric product. The mole ratio needed to produce a desired solution viscosity varies with the process variation used as well as the other three major factors previously listed, i.e. specific initiator employed, monomer concentration and temperature.

The relative amounts of monomer and water employed similarly influence the solution viscosity of the final product polymer. As the relative amount of monomer used is increased the solution viscosity also increases.

The temperature influence on final polymer solution viscosity is also determined experimentally. Again the method variation employed in the polymer preparation will effect the optimum temperature for obtaining a desired solution viscosity. In the full-charge and split-charge method variations, a temperature below about 70° C. is necessary initially to control the exothermic reaction. After this initial period of time, generally about 2 hours, the temperature is maintained in the range of about 70° to 100° C.

In all cases the total time is determined by sampling to the point of constant solution viscosity which is reached when the monomer is essentially completely polymerized unless the conditions chosen result in a water insoluble product.

Figure 2:
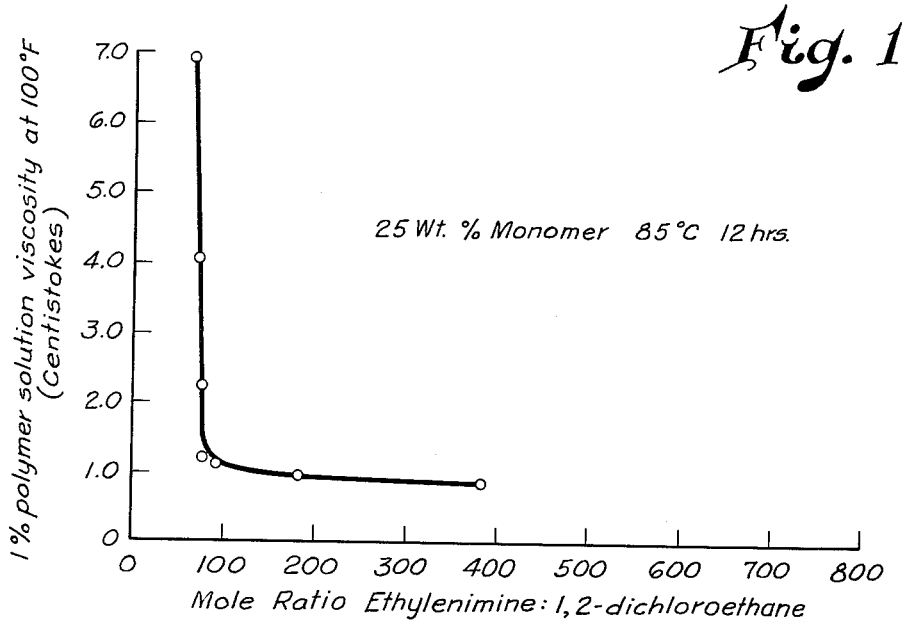

The following figures illustrate the foregoing discussion. FIGURE 1 demonstrates the direct relationship between the mole ratio of monomer to initiator used and the final polymer solution viscosity. These results, which are consistently reproducible, were for polyethylenimine prepared by the full-charge method wherein equal weights of monomer and water were employed, the temperature was held at 85° C. after the initial 2 hour heating period at 55° C., the total time of heating was 12 hours and the mole ratio of ethylenimine to the 1,2-dichloroethane initiator employed was varied as shown. FIGURE 2 represents similar data obtained for experiments which differed from those of FIGURE 1 only in that the weight ratio of ethylenimine to water was 1:3 rather than 1:1.

Figure 3:
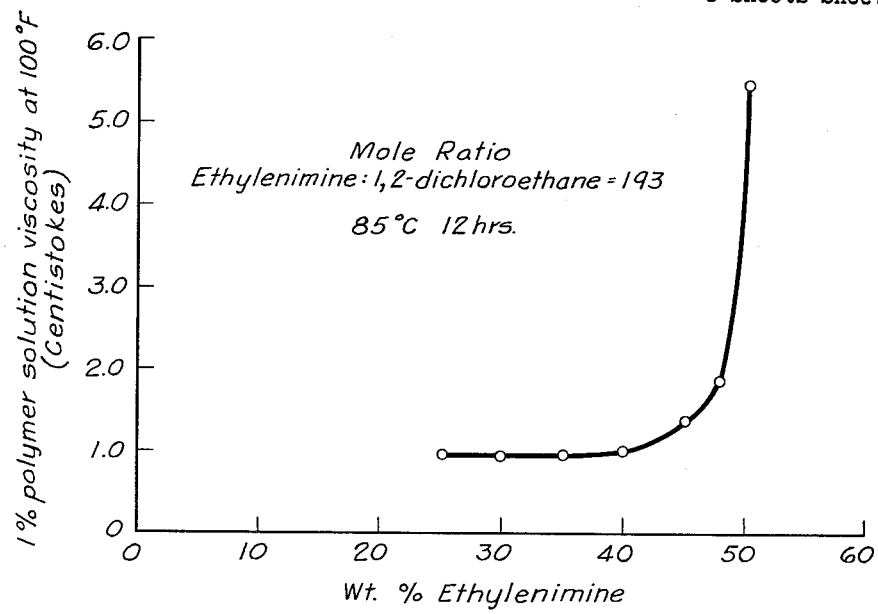

The effect of the relative amounts of monomer and water employed on the final polymer viscosity is graphically demonstrated in FIGURE 3 where the abscissa represents monomer employed in terms of weight percent of total monomer and water used. The mole ratio of ethylenimine to 1,2-dichloroethane was held at 193 and the temperature maintained at 85° C., after an initial 2 hour period of heating at 55° C., in each of the experiments which were conducted in accordance with the full-charge method.

Figure 4:
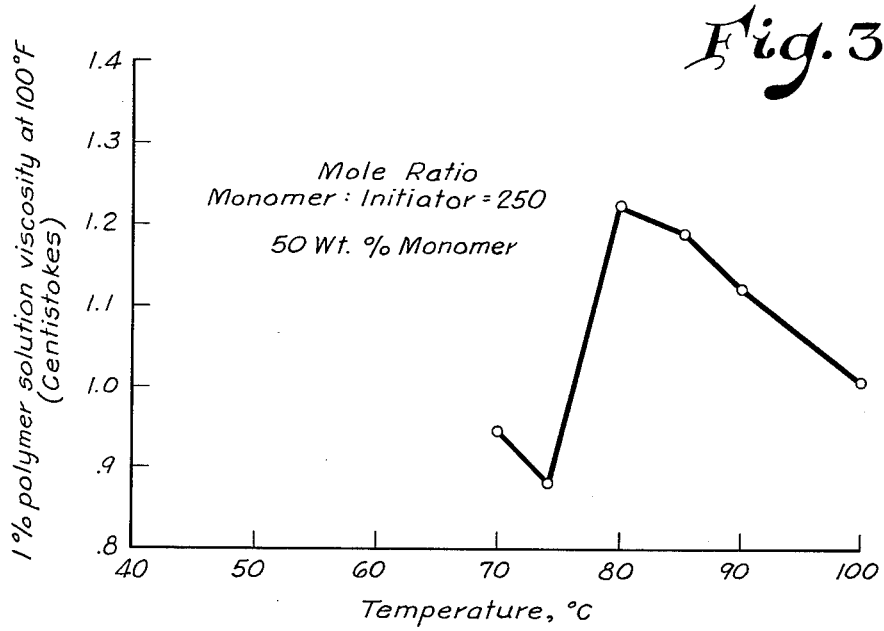
Figure 5:
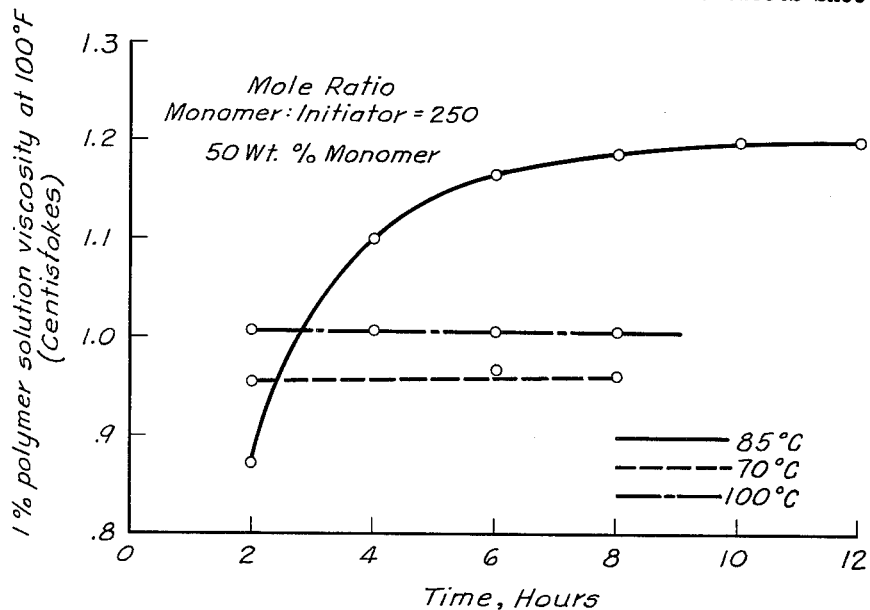
Figure 6:
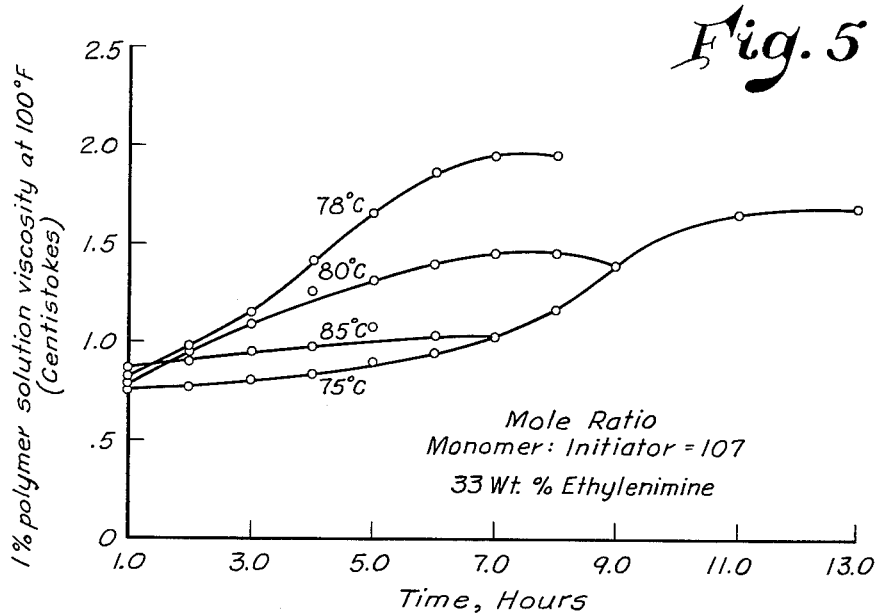

FIGURE 4 graphically represents the viscosity of the polyethylenimine, measured as an aqueous solution containing 1 percent polymer by weight, prepared by the full-charge method at various temperatures. A quantity of 0.004 mole of 1,2-dichloroethane per mole of ethylenimine was employed to effect polymerization of a solution of 50 parts by weight of ethylenimine and 50 parts by weight water. As shown by the graph, the viscosity of the polymer produced when these concentrations are used is a maximum when a temperature of 85° C. is maintained after the initial two hour period of heating at 55° C. This initial heating at lower temperatures is necessary, in this method variation, to control the exothermic reaction. FIGURE 5 demonstrates the gradual increase of viscosity with time, to a maximum value. The experimental conditions are those described for FIGURE 4 above. FIGURE 6 shows the effect of temperature and reaction time on viscosity of a polyethylenimine prepared by the constant-feed method. In this case, maximum viscosity results when a temperature of 78° C. is maintained after the addition of sufficient ethylenimine, to a mixture of water and 1,2-dichloroethane initiator, to (1) yield a mole ratio of ethylenimine added to initiator present of about 107 and (2) yield 33 parts of monomer added to 67 parts of water present.

The polyhalo initiators employed in the practice of the present invention are compounds having at least two active halogens per molecule selected from the group consisting of polyhaloalkanes and polyhaloalkylethers having from 2 to 6 halogen atoms per molecule wherein each alkane and alkyl group has from 1 to 4 carbon atoms, each halogen substituent thereon being independently selected from the group consisting of chlorine and bromine. Examples of these compounds are polyhaloalkanes having the formula $RX_n$, wherein R is an aliphatic hydrocarbon radical having from 1 to 4 carbon atoms inclusive, X is bromine and/or chlorine and $n$ is an integer from 2 to 6 inclusive, and polyhaloalkyl ethers having the formula:

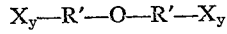

$$X_y—R'—O—R'—X_y$$

wherein R' is an aliphatic hydrocarbon radical having from 1 to 3 carbon atoms, inclusive, X is bromine and/or chlorine and $y$ is an integer from 1 to 3 inclusive. Specific examples of these compounds include dibromomethane, dichloromethane, ethylenedibromide, ethylene dichloride, 1,3-dibromopropane, 1,2-dibromobutane, 1,2 - dichloropropane, 1,2-dichlorobutane, bromoform, chloroform, 2,3-dichlorobutane, 2,3 - dibromobutane, dichloroethylether, dibromoethylether, dichloropropylether and dibromoethylether. Mixtures of two or more such initiators may be utilized as well as analogous initiators containing both bromine and chlorine.

The alkylenimine monomer is selected from the group consisting of ethylenimine, propylenimine, 1,2-butylenimine, 2,3-butylenimine and isobutylenimine.

The following examples describe completely representative specific embodiments of the present invention. These examples are not to be interpreted as limiting the invention other than as defined in the claims.

*Example 1*

A quantity of 300 milliliters of water and 2.25 milliliters of 1,2-dichloroethane was placed in a two-litter three-necked flask fitted with stirrer, thermometer and condenser. A quantity of 100 grams of ethylenimine was then added to the flask, the reaction temperature was raised to 55° C. and the solution digested for two hours. At the end of this time the temperature was raised to 85° C. and the reaction continued until the viscosity as determined on a 1 percent solution no longer increased. The final 1 percent solution viscosity of the polyethylenimine produced by this full-charge method and at a monomer concentration of 25 percent, was 1.14 centistokes at 100° F.

*Example 2*

This experiment was conducted following the full-charge method outlined above, but at a monomer concentration of 50 percent. A quantity of 200 milliliters water, 1.6 milliliters of 1,2-dichloroethane and 200 grams ethylenimine was employed. The final 1 percent viscosity determined at 100° F. was 1.21 centistokes.

*Example 3*

The same equipment employed in Example 1 was utilized in a constant feed method at 50 percent monomer concentration. A quantity of 200 milliliters of water and 1.6 milliliters of 1,2-dichloroethane was placed in the reaction flask. The temperature was raised to 85° C. and the heating equipment was removed. A quantity of 200 grams of ethylenimine was then added at a rate sufficient to maintain the reaction temperature at 85° C. The addition time was approximately two hours. After all of the ethylenimine had been added the reaction was continued by externally maintaining the temperature at 85° C. until the viscosity ceased to increase. The final 1 percent solution viscosity at 100° F. was 0.96 centistoke.

*Example 4*

Utilizing equipment similar to that of Example 1, 200 cc. of water, 1.0 cc. of 1,2-dichloroethane and 200 grams of ethylenimine were introduced into the two-liter reaction flask. This solution was digested for two hours at 55° C. and then for two hours at 85° C. At the end of this time the temperature was lowered to 25° C. and an additional 1.0 cc. of 1,2-dichloroethane was added. The reaction temperature was then raised to 85° C. and continued until sampling demonstrated a constant solution viscosity. The final 1 percent solution viscosity of the polyethylenimine produced by this split-charge method, at a 50 percent monomer concentration, was 1.02 centistokes at 100° F.

*Example 5*

A quantity of 200 g. of ethylenimine, 200 g. of water and 1.82 ml. of 1,3-dichloropropane was employed in accordance with the procedure of Example 2. The final 1 percent solution viscosity was 3.82 centistokes.

*Example 6*

A quantity of 200 g. of ethylenimine, 200 g. of water and 2.2 ml. of dichloroethylether was employed in accordance with the procedure of Example 2. The final 1 percent solution viscosity was 0.86 centistoke.

*Example 7*

A quantity of 200 g. of ethylenimine, 200 g. of water and 1.2 ml. of dichloromethane was employed in accordance with the procedure of Example 2. The final 1 percent solution viscosity was 0.88 centistoke.

*Example 8*

The effect of the halogen employed as the initiator was investigated by utilizing 1,2-dibromoethane and 1,2-dichloroethane in otherwise similar experiments. A quantity of 200 g. of water and 200 g. of ethylenimine was employed in both experiments which were conducted in accordance with the procedure of Example 2. The final 1 percent solution viscosity was 2.05 centistokes when 1.6 ml. of 1,2-dibromoethane were employed as the initiator and 1.21 centistokes when 1.6 ml. of dichloroethane was employed as the initiator. The mole ratio of monomer to initiator was about 259 in the experiment utilizing 1,2- dibromoethane and about 229 in the experiment utilizing 1,2-dichloroethane.

*Example 9*

A quantity of 200 g. of ethylenimine, 200 g. of water and 0.74 ml. of chloroform was employed in accordance with the procedure of Example 2. The final 1 percent solution viscosity was 0.85 centistoke.

The yield in the preceding examples was approximately 100 percent polymerization of the ethylenimine with analysis revealing only a trace of ethylenimine monomer remaining after completion of the reaction.

Similar results are obtained by substituting propylenimine, 1,2-butylenimine, 2,3-butylenimine or isobutylenimine for the ethylenimine employed in the preceding examples.

The following example details the procedure used to test the flocculent activity of polyethylenimines prepared in accordance with the present invention.

*Example 10*

A standard slurry was prepared by mixing 70 weight percent silica and 30 weight percent illite clay. A stock slurry, consisting of 10 weight percent of this standard slurry and 90 weight percent water, was mixed in a 100 cc. cylinder by repeatedly inverting the cylinder. The flocculating solution, containing 0.05 weight percent polyethylenimine in aqueous solution, was added in three portions, separately mixing each portion into the slurry by gently inverting the cylinder. For example, to add one milliliter of flocculent solution to a test sample, first mix the sample by inverting the stoppered cylinder three times, add ⅓ milliliter of flocculent solution and invert three times, add another ⅓ milliliter of flocculent and invert three times and repeat with the final ⅓ milliliter of flocculent. After the final addition and mixing of the flocculent the time required for the interface to settle to the 10 milliliter level is recorded and the readings are continued through the free settling zone for the slurry at 10 milliliter intervals. The settling rate is reported in inches per minute in the free settling zone. A total of 5 ml. of an aqueous solution containing 0.05 weight percent polyethylenimine was used to obtain the reported flocculation rates.

Table I below shows representative samples prepared by each of the three methods previously discussed together with measurements of wet strength and flocculation characteristics. The flocculation rate was determined by the procedure of Example 10, above. The utility of these polymeric products as additives to impart wet strength to paper was determined by a procedure of the Technical Association of the Pulp and Paper Industry designated as T 205m–53. Each sample was prepared using 1,2-dichloroethane as the initiator and a monomer concentration of 50 weight percent. A temperature of 85° C. was employed in each case with an initial 2 hour heating period of 55° C .in the full-charge and split-charge methods.

TABLE I

| Method of Polymer Preparation | Mole Ratio, Monomer/ Initiator | 1% Viscosity at 100° F. | Flocculation rate, in./min. | Wet Strength, lbs./in. |
|---|---|---|---|---|
| Constant feed | 243 | 0.96 | 3.38 | |
| Do | 166 | 1.24 | 4.53 | 5.08 |
| Do | 156 | 2.46 | 5.34 | 5.65 |
| Full-charge | 258 | 1.21 | 4.13 | 4.66 |
| Do | 243 | 1.56 | 4.47 | 2.82 |
| Split-charge | 180 | 1.02 | 3.69 | 5.08 |
| Do | 156 | 2.46 | 6.19 | 6.98 |
| Do | 61 | 4.56 | 5.18 | 7.80 |

I claim:
1. A method for preparing polyalkylenimines which comprises heating together at a temperature from about 50° C. to the boiling point of the solution an aqueous 5 to 75 weight percent solution of an alkylenimine and a polyhalo polymerization initiator selected from the group consisting of polyhaloalkanes and polyhaloalkylethers having from 2 to 6 halogen atoms per molecule wherein each alkane and alkyl group has from 1 to 4 carbon atoms, each halogen substituent thereon being independently selected from the group consisting of chlorine and bromine, in a ratio of from about 0.02 to 0.002 mole of initiator per mole of alkylenimine for a time sufficient to yield a resinous polyalkylenimine.

2. The method of claim 1, wherein the alkylenimine is selected from the group consisting of ethylenimine, propylenimine, isobutylenimine, 1,2-butylenimine and 2,3-butylenimine.

3. The method of claim 1, wherein the polymerization initiator is a polyhaloalkane having the formula:

wherein R is an aliphatic hydrocarbon radical having from 1 to 4 carbon atoms, inclusive, X is a halogen having an atomic weight greater than 35 and less than 80 and $n$ is an integer from 2 to 6, inclusive.

4. The method of claim 1, wherein the polymerization initiator is a polyhaloalkylether having the formula:

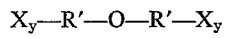

wherein R' is an aliphatic hydrocarbon radical having from 1 to 3 carbon atoms, inclusive, X is a halogen having an atomic weight greater than 35 and less than 80 and $y$ is an integer from 1 to 3, inclusive.

5. The method of claim 1 wherein the aqueous solution of alkylenimine and the polymerization initiator are mixed together and heated at a temperature of from about 50° to 65° C. for about 2 hours followed by heating at a temperature of from about 75° C. to 95° C. to yield a resinous polyalkylenimine.

6. The method of claim 1, wherein the alkylenimine is added to a heated mixture of the polymerization initiator and water at a rate sufficient to maintain the temperature of the exothermic polymerization reaction at about 75° to 95° C. until sufficient alkylenimine has been added to establish a weight ratio of alkylenimine added to water employed of from 15:85 to 75:25, whereupon the temperature is maintained at abou t75° to 95° C. for a time sufficient to yield a resinous polyalkylenimine.

7. The method of claim 1, wherein the aqueous solution of alkylenimine and a minor proportion of the total polymerization initiator to be employed are mixed together and heated at a temperature from about 50° to 65° C. for about 2 hours followed by addition of the remaining portion of the polymerization initiator and maintenance of a temperature of from about 75° to 95° C. for a time sufficient to yield a resinous polyalkylenimine.

8. A method for preparing polyethylenimine which comprises heating together at a temperature from about 50° C. to the boiling point of the solution, an aqueous solution of ethylenimine at a concentration from about 5 to 75 percent by weight and a polyhalo polymerization initiator selected from the group consisting of polyhaloalkanes and polyhaloalkylethers having from 2 to 6 halogen atoms per molecule wherein each alkane and alkyl group has from 1 to 4 carbon atoms, each halogen substituent thereon being independently selected from the group consisting of chlorine and bromine in a ratio of from about 0.02 to 0.002 mole of initiator per mole of ethylenimine until the resulting aqueous solution of polyethylenimine reaches a desired viscosity.

9. The method of claim 8 wherein the weight ratio of ethylenimine and water is about 1:3, the polymerization initiator is 1,2-dichloroethane and the mole ratio of ethylenimine to 1,2-dichloroethane is from about 75:1 to 200:1.

10. The method of claim 8 wherein the weight ratio of ethylenimine and water is about 1:1, the initiator is 1,2-dichloroethane and the mole ratio of ethylenimine to 1,2-dichloroethane is from about 170:1 to 300:1.

11. The method of claim 10 wherein the initiator is 1,3-dichloropropane and the mole ratio of ethylenimine to 1,3-dichloropropane si from about 200:1 to 300:1.

12. The method of claim 10 wherein the initiator is dichloromethane and the mole ratio of ethylenimine to dichloromethane is from about 180:1 to 300:1.

13. The method of claim 10 wherein the initiator is dichloroethylether and the mole ratio of ethylenimine to dichloroethylether is from about 200:1 to 300:1.

14. The method of claim 10 wherein the initiator is 1,2-dibromoethane and the mole ratio of ethylenimine to 1,2-dibromoethane is from about 200:1 to 300:1.

15. The method of claim 10 wherein the initiator is chloroform and the mole ratio of ethylenimine to chloroform is from about 450:1 to 500:1.

16. A method for preparing polyalkylenimines which comprises the steps of mixing together (1) water, (2) from about 0.05 to 3 parts by weight of a 1,2-alkylenimine per part by weight of water present, said 1,2-alkylenimine having from 2 to 4 carbon atoms per molecule, and (3) from about 0.02 to 0.002 mole of a polyhalo organic initiator per mole of alkylenimine, said polyhalo organic initiator being selected from the group consisting of polyhaloalkanes and polyhaloalkylethers having from 2 to 6 halogen atoms per molecule wherein each alkane and alkyl group has from 1 to 4 carbon atoms, each halogen substituent thereon being independently selected from the group consisting of chlorine and bromine and heating the reaction system at a temperature within the range from about 50° to 100° C. whereby a resinous polyalkylenimine is obtained.

References Cited by the Examiner
UNITED STATES PATENTS

| 2,182,306 | 12/39 | Ulrich et al. | 260—2 |
| 2,553,696 | 5/51 | Wilson | 260—2 |

FOREIGN PATENTS 466,345   5/37   Great Britain.

MURRAY TILLMAN, *Primary Examiner.*

JOSEPH L. SCHOFER, *Examiner.*

UNITED STATES PATENT OFFICE
CERTIFICATE OF CORRECTION

Patent No. 3,203,910

August 31, 1965

Billy W. Wilson

It is hereby certified that error appears in the above numbered patent requiring correction and that the said Letters Patent should read as corrected below.

Column 1, line 21, after "solutions" insert -- with desired viscosities. The control of aqueous solution --; line 48, for "step" read -- steps --; line 56, for "ployhalo" read -- polyhalo --; column 3, line 72, for "two-litter" read -- two-liter --; column 6, line 43, for "abou t75°" read -- about 75° --; column 7, line 4, for "si" read -- is --.

Signed and sealed this 20th day of September 1966.

(SEAL)
Attest:

ERNEST W. SWIDER
Attesting Officer

EDWARD J. BRENNER
Commissioner of Patents